April 22, 1924.

G. H. SCHRUM

TRACTOR HITCH 1,491,637

Filed Aug. 22, 1922  2 Sheets-Sheet 1

WITNESSES
R. A. McLeod
G. E. Egerton

Inventor
G. H. Schrum

By Richard B. Owen
Attorney

April 22, 1924.
G. H. SCHRUM
TRACTOR HITCH
Filed Aug. 22, 1922    2 Sheets-Sheet 2
1,491,637
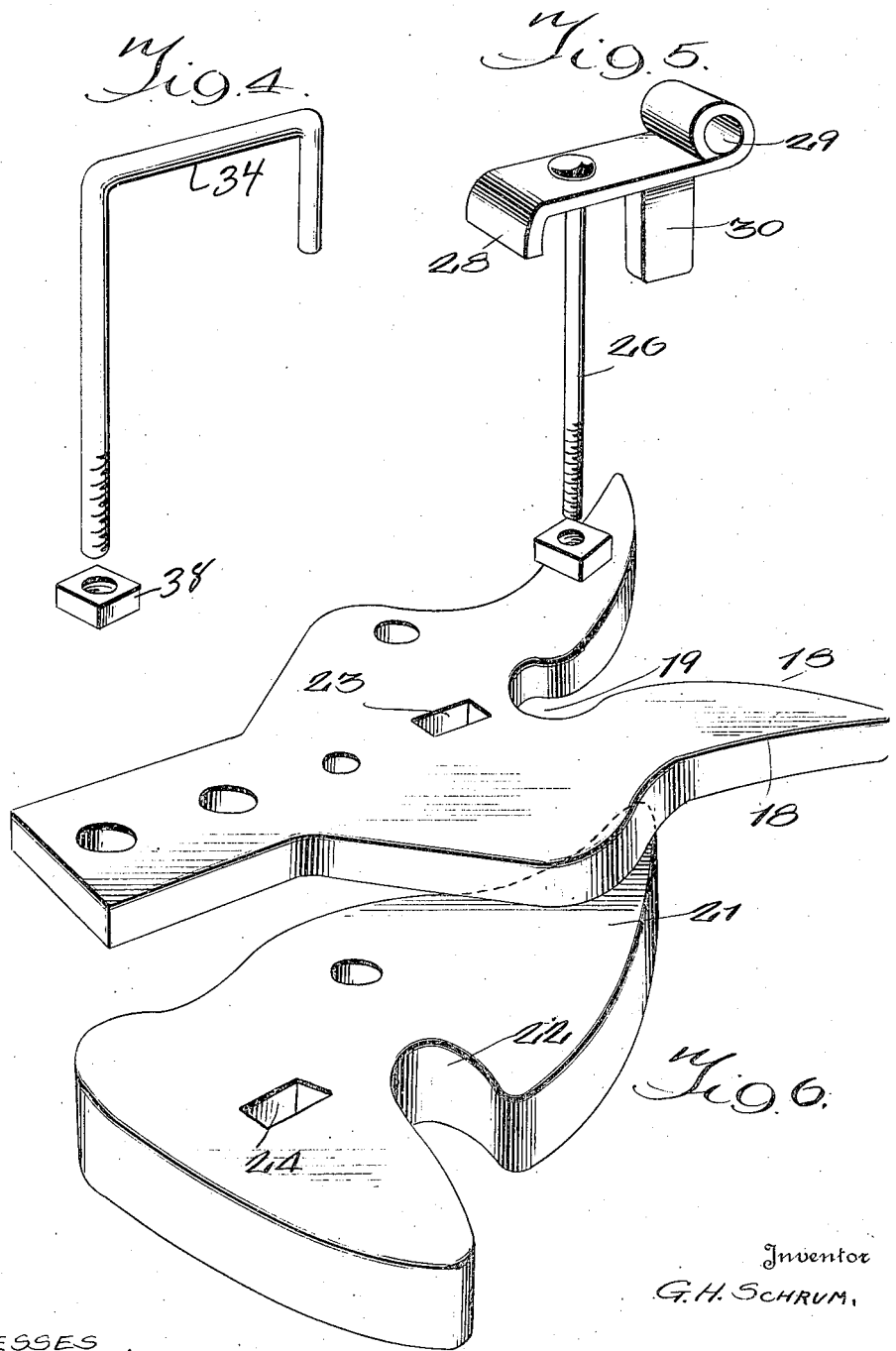

Patented Apr. 22, 1924.

1,491,637

UNITED STATES PATENT OFFICE.

GEORGE H. SCHRUM, OF TEMPLETON, IOWA.

TRACTOR HITCH.

Application filed August 22, 1922. Serial No. 583,579.

*To all whom it may concern:*

Be it known that I, GEORGE H. SCHRUM, a citizen of the United States, residing at Templeton, in the county of Carroll and State of Iowa, have invented certain new and useful Improvements in Tractor Hitches, of which the following is a specification.

This invention relates to tractors and has special reference to a connecting bar for connecting a tractor to farm implements, or wagons, or the like.

One important object of the invention is to improve the general construction of devices of this description.

A second important object of the invention is to provide a device of this description which is of improved construction and which may be readily released from the wagon or implement which is being pulled or pushed by the tractor.

A third object of the invention is to provide a device of this description which may be used, either as a swinging connection or as a stiff connection to the implement or wagon.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 4 is a detail view of one of the locking pins used herewith.

Figure 5 is a detail view of another locking device used in this connection.

Figure 6 is a detail perspective of a latch controlled by the locking device shown in Figure 5 and used for the connection to the vehicle.

Figure 1:
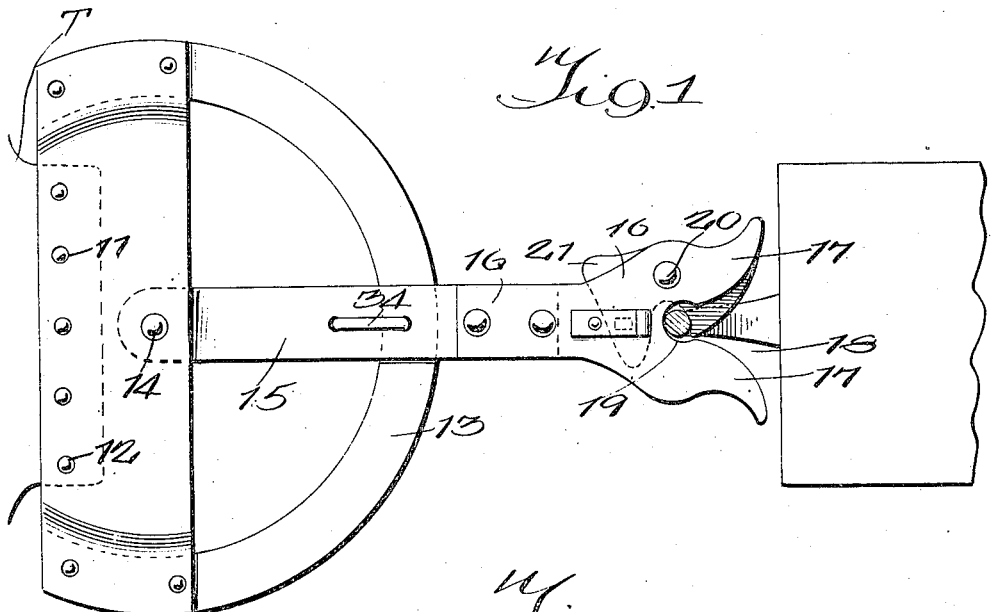
Figure 1 is a plan view of the device assembled and showing the portion of a tractor and the front of a vehicle tongue connected thereby.
Figure 2:
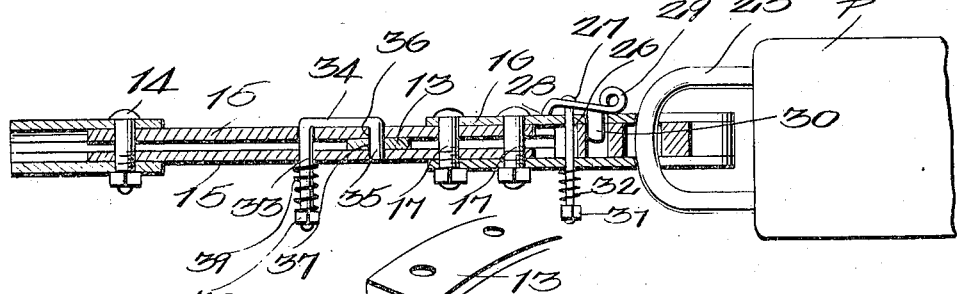
Figure 2 is a detail section partly in elevation, on the line 2—2 of Figure 1.
Figure 3:
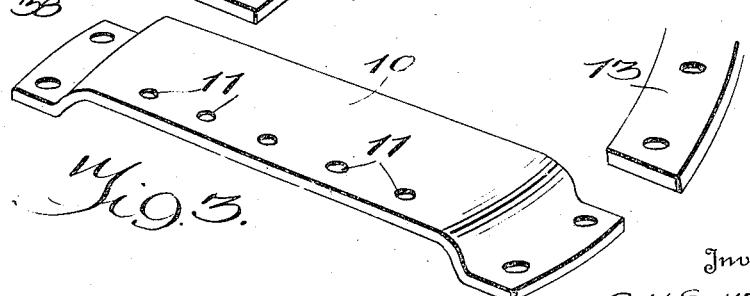
Figure 3 is a detail perspective view of a certain supporting arc and plate used herewith.

In carrying out this device it is preferred to connect to the rear end of a tractor T a pair of plates 10 having their ends offset, the central portions of these plates being provided with suitable openings 11 to receive rivets 12 securing the plates in spaced relation on the tractor. Between the offset ends of these plates is mounted a supporting arc or 5th wheel 13 and between the center portions of the plate 10 extends a pivot pin 14 whereon is mounted a pair of traction members or bars 15, one of these bars lying above and the other below the arc 13. Projecting from these bars is a pair of forks 16 which are secured to the bars by bolts 17 passing through the stems of the forks and the free ends of the bars 15. These forks 16 have outwardly diverging arms 17 thus providing a flaring mouth 18 which terminates inwardly in a pocket 19. Through one of the arms 17 extends a pivot pin 20 whereon is mounted a latch member 21 having a hook portion 22 which, when the latch member is in locking position closes the pocket 19. Just behind the pocket 19 one of the forks is provided with a slot 23 and the latch 21 is provided with a similar slot 24 which registers with the slot 23 when the device is in locking position as for instance when it engages a clevice 25 on the end of a vehicle pole P. Through the forks 16 passes a bolt or pin 26 whereon is pivoted a locking plate 27, the pivoting being effected by mounting the opening for the pin sufficiently larger than said pin to permit rocking movement of the plate 27. One end of this plate is turned downward as at 28 to form a fulcrum while the other end forms a lifting eye 29. From beneath this plate projects a pin 30 which passes through the opening 23 and into the slot or opening 24 to lock the latch 21 against movement when the latter is in locking position. The pin 26 is provided on its lower end with a nut 31 and between this nut and the lower fork is a spring 32 which constantly urges the pin downward and thus holds the member 30 in position. Extending through the arms 15 adjacent the arc 13 is a pin 33 which has its upper end bent at right angles as at 34 and again bent downward at right angles as at 35 so as to pass through an opening 36 in the upper plate or bar 15 and through an opening 37 in the arc 13. This pin 33 also is provided with a nut 38 and spring 39 so as to hold it in locking position. From the foregoing it will be obvious that by freeing the end 35 from the opening 37 the arms 15 may swing on the pivot 14 and thus a swinging connection will be established. Also a rigid or stiff connection may be formed by engaging the pin 35 in said opening 37. In like manner lifting the eye 29 will free the latch member and release the clevice 25.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described but it is desired to include all such as properly come within the scope claimed.

Having thus described the invention what is claimed as new, is:—

In a device of the kind described, a pair of spaced plates, a supporting arc having its ends secured between the ends of said plates, a pair of arms pivoted to said plates concentric of the arc and lying one above and one below said arc fork members bolted to said arms and extending in alignment therewith, a latch member pivoted to said arms and lying between the same, said fork members having flaring mouths terminating inwardly in a pocket and the latch member swinging to open and close said pocket, openings in one of said plates and the latch member movable into and out of registry, a spring pressed locking pin adapted to enter said openings when in registry and thereby to hold the latch member against movement, said supporting arc and arms likewise having openings into and out of registry, and a second locking pin spring pressed and adapted to enter the last mentioned openings when in registry whereby to lock the said arms from movement on their pivots.

In testimony whereof I affix my signature in presence of two witnesses.

GEORGE H. SCHRUM.

Witnesses:
R. LANE,
LOUIS G. SCHRECK.